United States Patent
Buron et al.

(10) Patent No.: US 9,747,720 B2
(45) Date of Patent: Aug. 29, 2017

(54) METHOD AND DEVICE FOR PROCESSING A GEOMETRY IMAGE OF A 3D SCENE

(71) Applicant: THOMSON LICENSING, Issy de Moulineaux (FR)

(72) Inventors: Cyprien Buron, Rennes (FR); Jean-Eudes Marvie, Betton (FR); Patrice Hirtzlin, Betton (FR)

(73) Assignee: THOMSON LICENSING, Issy les Moulineaux (FR)

( * ) Notice: Subject to any disclaimer, the term of this patent is extended or adjusted under 35 U.S.C. 154(b) by 34 days.

(21) Appl. No.: 14/611,323

(22) Filed: Feb. 2, 2015

(65) Prior Publication Data

US 2015/0221129 A1    Aug. 6, 2015

(30) Foreign Application Priority Data

Feb. 3, 2014  (EP) .................................... 14305145

(51) Int. Cl.
*G06T 17/20* (2006.01)
*G06T 15/00* (2011.01)

(52) U.S. Cl.
CPC ............ *G06T 17/20* (2013.01); *G06T 15/005* (2013.01)

(58) Field of Classification Search
CPC .................................................... G06T 17/20
See application file for complete search history.

(56) References Cited

U.S. PATENT DOCUMENTS

| | | |
|---|---|---|
| 7,586,488 B2 | 9/2009 | Sander et al. |
| 7,733,350 B2 * | 6/2010 | Lefebvre ............... G06T 11/001 345/582 |
| 2015/0035774 A1 * | 2/2015 | Christiansson ......... G06F 3/046 345/173 |

OTHER PUBLICATIONS

Francisco González, Gustavo Patow, Continuity mapping for multi-chart textures, ACM Transactions on Graphics (TOG), v.28 n.5, Dec. 2009.*
Sheffer et al., "Mesh parameterization methods and their applications", Foundation and trends in computer Graphics and Vision, vol. 2, No. 2, 2006, pp. 105-171.
Sander—et al "Multi chart geometry images"—Eurographics Symposium on geometry processing, 2003, pp. 146-155.
Wang et al—Connectivity preserving geometry images, Dec. 2013, pp. 1-15.

(Continued)

*Primary Examiner* — Kee M Tung
*Assistant Examiner* — Grace Q Li
(74) *Attorney, Agent, or Firm* — Tutunjian & Bitetto, P.C.

(57) ABSTRACT

Method and device for processing a geometry image generated from a mesh associated with a 3D scene and comprising a plurality of charts that each represents a part of the 3D scene, the method comprising computing a reference direction from mesh coordinates associated with a current pixel and mesh coordinates associated with a first pixel, the first pixel corresponding to a pixel of the border of the first chart located along a determined direction having as origin the current pixel; comparing the reference direction with a set of candidate directions being each computed from the mesh coordinates associated with the at least one current pixel and indirection mesh coordinates associated with one pixel of the neighbourhood of the first pixel, the indirection mesh coordinates corresponding to mesh coordinates of a pixel of the border a second chart corresponding to the pixel of the neighbourhood of the first pixel; and selecting a pixel of the border of the second chart according to the comparison result.

14 Claims, 6 Drawing Sheets

(56) References Cited

OTHER PUBLICATIONS

Gu et al—Geometry images—ACM Transactions on Graphics—vol. 21 pp. 355-361—ACM 2002.
Search Report Dated Jul. 17, 2014.
Pierre Alliez et al, Anisotropic Polygonal Remeshing, Institut National De Recherche En Informatique Et En Automatique, pp. 1-30, Apr. 2003, vol. No. 4808, Cedex, France.
Nathan A Carr, et al, Fast GPU Ray Tracing of Dynamic Meshes Using Geometry Images, GI '06 Proceedings of Graphics Interface, Jun. 7-9, 2006, pp. 203-209, Canadian Information Processing Society Toronto, Ont., Canada.
Wei-Wen Feng et al, Feature-Preserving Triangular Geometry Images for Level-of-Detail Representation of Static and Skinned Meshes, ACM Transactions on Graphics, Mar. 2010, pp. 1-12, vol. 29, No. 2, Article 11.
Martti Mantyla, An Introduction to Solid Modeling, 1988, pp. 1-401, Computer Science Press, Inc. New York, NY, USA.
Weiliang Meng et al, Differential Geometry Images: Remeshing and Morphing with Local Shape Preservation, The Visual Computer, Jan. 2010, pp. 51-62, ISSN 0178-2789, Publisher Springer-Verlag.
Nie Junlan et al, GPU-Accelerated Fast Rendering Method for Multi-Resolution Geometry Image, Journal of Computer-Aided Design & Computer Graphics, Jan. 2013, pp. 101-109, vol. 25, Issue No. 1, China Academic Journal Electronic Publishing House, With English Abstract.
Ming-Qiang Wei et al, Remeshing Triangulations Based on Constructing and Resampling Geometry Images, 009 IEEE International Conference on Intelligent Computing and Intelligent Systems, Nov. 20-22, 2009, pp. 265-269, IEEE.

\* cited by examiner

METHOD AND DEVICE FOR PROCESSING A GEOMETRY IMAGE OF A 3D SCENE

This application claims the benefit, under 35 U.S.C. §119 of European Patent Application No. 14305145.6, filed Feb. 3, 2014.

1. TECHNICAL FIELD

The present disclosure relates to the domain of processing one or more geometry images of a 3D scene and to the reconstruction of a 3D scene from the associated geometry image. The present disclosure is also understood in the context of Computer Generated Image (CGI or 3D-CGI), geometry processing and modelling.

2. BACKGROUND ART

According to the background art, it is known to represent a 3D scene with a mesh data structure. Various mesh data structure have been developed and optimized for a GPU usage. Data structures such as half-edge data representation, quad-trees, octo-trees, BVH, etc aim at efficiently encoding triangles information. While such a conservative approach permits to store every triangle of the mesh, it is also more complex to generate and to use than texture-based approaches. In this latter category of data structures, mesh information is encoded as a classical texture that is easily accessed on the GPU using shaders.

Among texture-based methods, Gu et al. introduced geometry images in "Geometry images" (in ACM Transactions on Graphics (TOG), volume 21, pages 355-361. ACM, 2002). Starting from a mesh, a surface parameterization is first computed so that the mesh is topologically equivalent to a disk. A geometry image is then generated by rendering the mesh into a texture using the uv parameterization instead of vertices positions. The result is a flat textured representation of the mesh where each pixel contains one interpolated vertex position value. Other information such as normal and texture coordinates may also be stored as per pixel values. This geometry image can then be used to approximately reconstruct the initial mesh.

Sanders et al. extended this work in "Multi-chart geometry images" (in proceedings of the 2003 Eurographics/ACM SIGGRAPH symposium on Geometry processings, pages 146-155, Euro-graphics Association, 2003) to multi-charts geometry images to limit distortions introduced in Gu et al. To do this, multiple cuts are found over the mesh to extract various charts parameterized independently. The charts are then distributed all over the texture through a chart placement algorithm. Finally, the classical geometry images rendering is applied in a first pass to generate the multi-charts geometry image. As rasterization on the border of the two adjacent charts may give different values on each chart, they apply a border zippering algorithm. The algorithm avoids cracks and ensures continuity at chart borders. In a second pass, a one-pixel large border is created around each chart to force neighboring charts to share the exact same border. Better reconstructions are obtained, minimizing distortion artifacts.

Geometry images have been used for efficient ray-tracing of meshes on the GPU, proving this structure suitable for the GPU. However, while the reconstruction based on multi-chart geometry image is seamless due to the border zippering, each chart of the geometry image is independent from its neighbors. This representation does not allow jumping from a chart to another at run-time. For instance, being on border pixel of a source chart of the geometry image, there is no solution to find its neighbor in a destination chart. While geometry images are good mesh data structure for fast GPU access, it is impossible to use such representation to arbitrarily move around the object because charts are always independent.

3. SUMMARY

The purpose of the present disclosure is to overcome at least one of these disadvantages of the background art.

More specifically, the purpose of the present disclosure is to link charts of a geometry image with each others.

The present disclosure relates to a method of processing a geometry image, the geometry image being generated from a mesh associated with a 3D scene, the geometry image comprising a first chart and at least a second chart, each first and second chart representing a part of the 3D scene. The method comprises the following steps, for at least one current pixel of the first chart different from pixels of the first chart forming border of the first chart:

computing a reference direction from mesh coordinates associated with the at least one current pixel and mesh coordinates associated with a first pixel, the first pixel corresponding to a pixel of the border of the first chart located along a determined direction having as origin the at least one current pixel, comparing the reference direction with a set of candidate directions, each candidate direction being computed from the mesh coordinates associated with the at least one current pixel and indirection mesh coordinates associated with one pixel of the neighbourhood of the first pixel, the indirection mesh coordinates corresponding to mesh coordinates of a pixel of the border of the at least a second chart corresponding to the pixel of the neighbourhood of the first pixel, selecting a pixel of the border of the at least a second chart according to the comparison result.

According to a particular characteristic, pixels of the neighbourhood of the first pixel used to compute candidate directions belong to the border of the first chart.

Advantageously, pixels of the neighbourhood of the first pixel used to compute candidate directions are outside the boundary of the first chart and adjacent to the selected pixel.

According to a specific characteristic, the pixel of the border of the at least a second chart which corresponds to the pixel of the neighbourhood of the first pixel is determined by comparing the mesh coordinates of the pixel of the neighbourhood of the first pixel with mesh coordinates of a plurality of pixels of the border of the at least a second chart, the determined pixel of the border of the at least a second chart being the pixel for which the difference between its mesh coordinates and the mesh coordinates of the pixel of the neighbourhood of the first pixel is minimal.

Advantageously, the selected pixel corresponds to the pixel for which the difference between the reference direction and the candidate direction associated to the selected pixel is minimal with regard to the differences between the reference direction and the other candidate directions.

According to another characteristic, the method further comprises determining a direction for scanning the at least a second chart corresponding to the determined direction, the direction being determined according to the determined direction, a tangent to the border of the first chart at the first pixel and a tangent to the border of the at least a second chart at the selected pixel.

The present disclosure also relates to a device configured for processing a geometry image, the geometry image being generated from a mesh associated with a 3D scene, the geometry image comprising a first chart and at least a second chart, each first and second chart representing a part of the 3D scene, the device comprising at least one processor configured for, for at least one current pixel of the first chart different from pixels of the first chart forming border of the first chart:

computing a reference direction from mesh coordinates associated with the at least one current pixel and mesh coordinates associated with a first pixel, the first pixel corresponding to a pixel of the border of the first chart located along a determined direction having as origin the at least one current pixel, comparing the reference direction with a set of candidate directions, each candidate direction being computed from the mesh coordinates associated with the at least one current pixel and indirection mesh coordinates associated with one pixel of the neighbourhood of the first pixel, the indirection mesh coordinates corresponding to mesh coordinates of a pixel of the border of the at least a second chart corresponding to the pixel of the neighbourhood of the first pixel, selecting a pixel of the border of the at least a second chart according to the comparison result.

Advantageously, the at least one processor is further configured for comparing the mesh coordinates of the pixel of the neighbourhood of the first pixel with mesh coordinates of a plurality of pixels of the border of the at least a second chart to determine the pixel of the border of the at least a second chart which corresponds to the pixel of the neighbourhood of the first pixel, the determined pixel of the border of the at least a second chart being the pixel for which the difference between its mesh coordinates and the mesh coordinates of said pixel of the neighbourhood of the first pixel is minimal.

According to a specific characteristic, the at least one processor is further configured for determining a direction for scanning the at least a second chart corresponding to the determined direction, the direction being determined according to the determined direction, a tangent to the border of the first chart at said first pixel and a tangent to the border of the at least a second chart at the selected pixel.

According to another characteristic, the at least one processor is a Graphical Processor Unit (GPU).

The present disclosure also relates to a computer program product comprising instructions of program code for execution by at least one processor to perform the method of processing a geometry image, when the program is executed on a computer.

The present disclosure also relates to a processor readable medium having stored therein instructions for causing a processor to perform the method of processing a geometry image.

4. LIST OF FIGURES

The present disclosure will be better understood, and other specific features and advantages will emerge upon reading the following description, the description making reference to the annexed drawings wherein.

Figure 1:
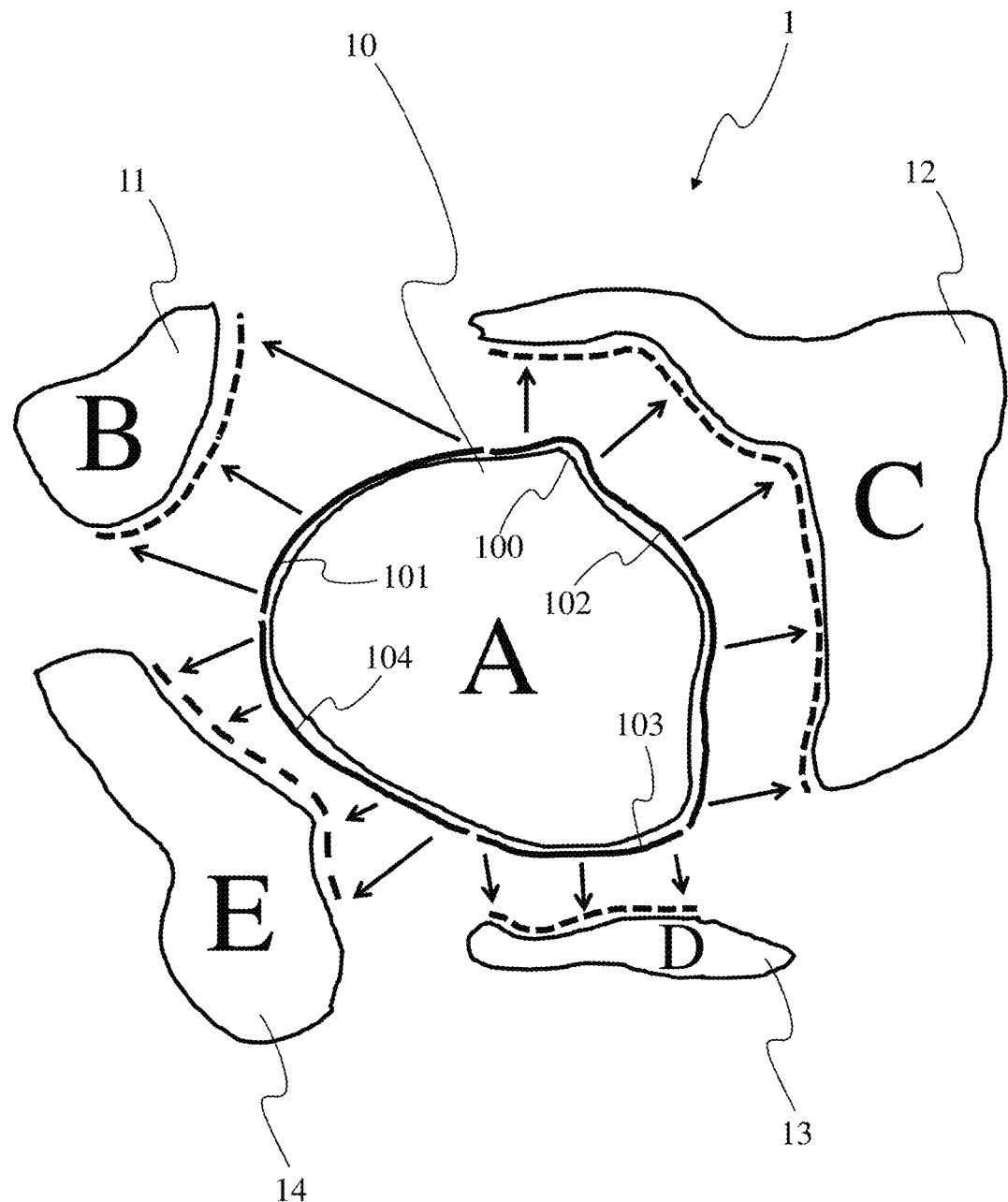
FIG. 1 shows a geometry image comprising a plurality of charts, according to a particular embodiment.
Figure 5:
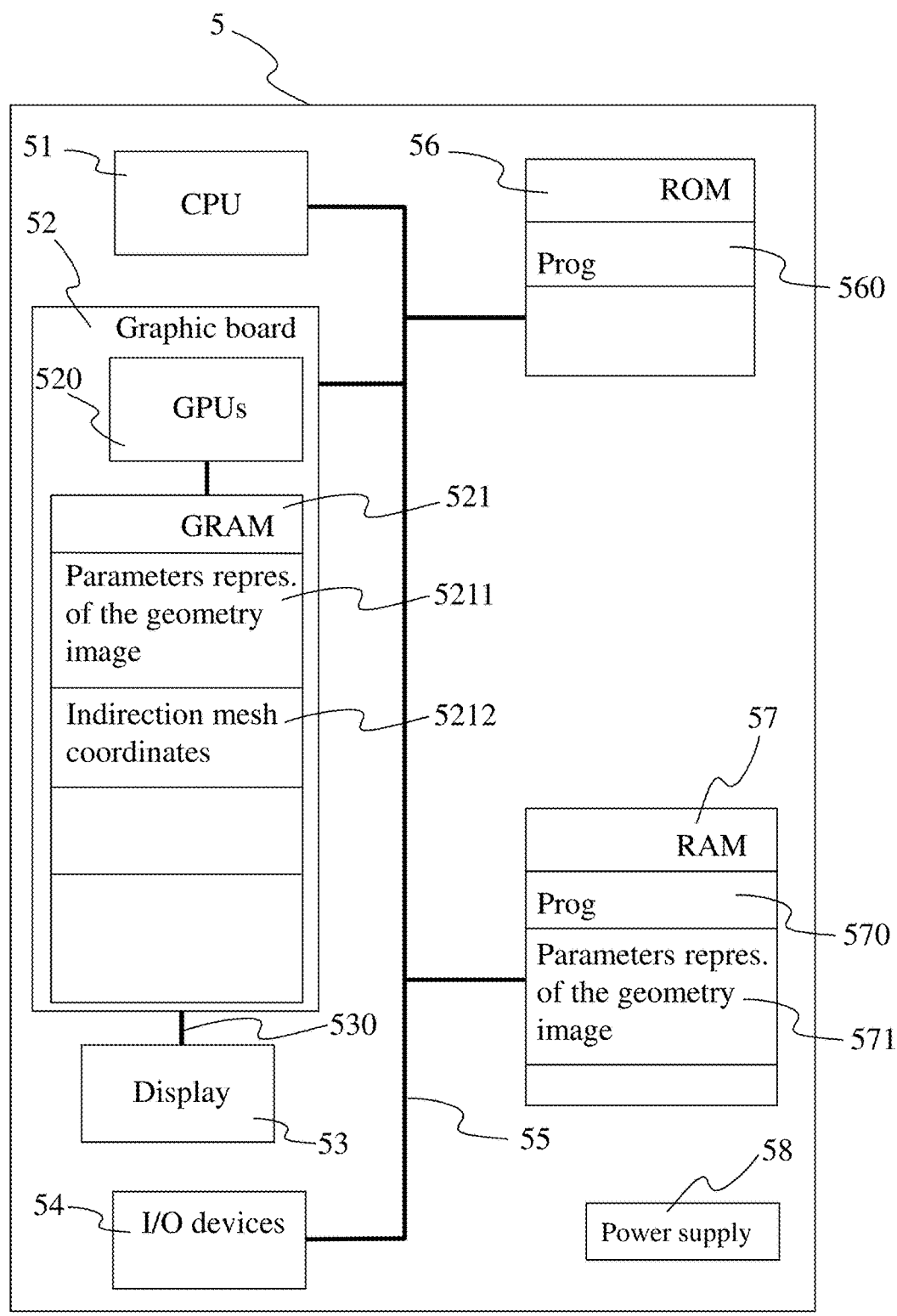
Figure 6:
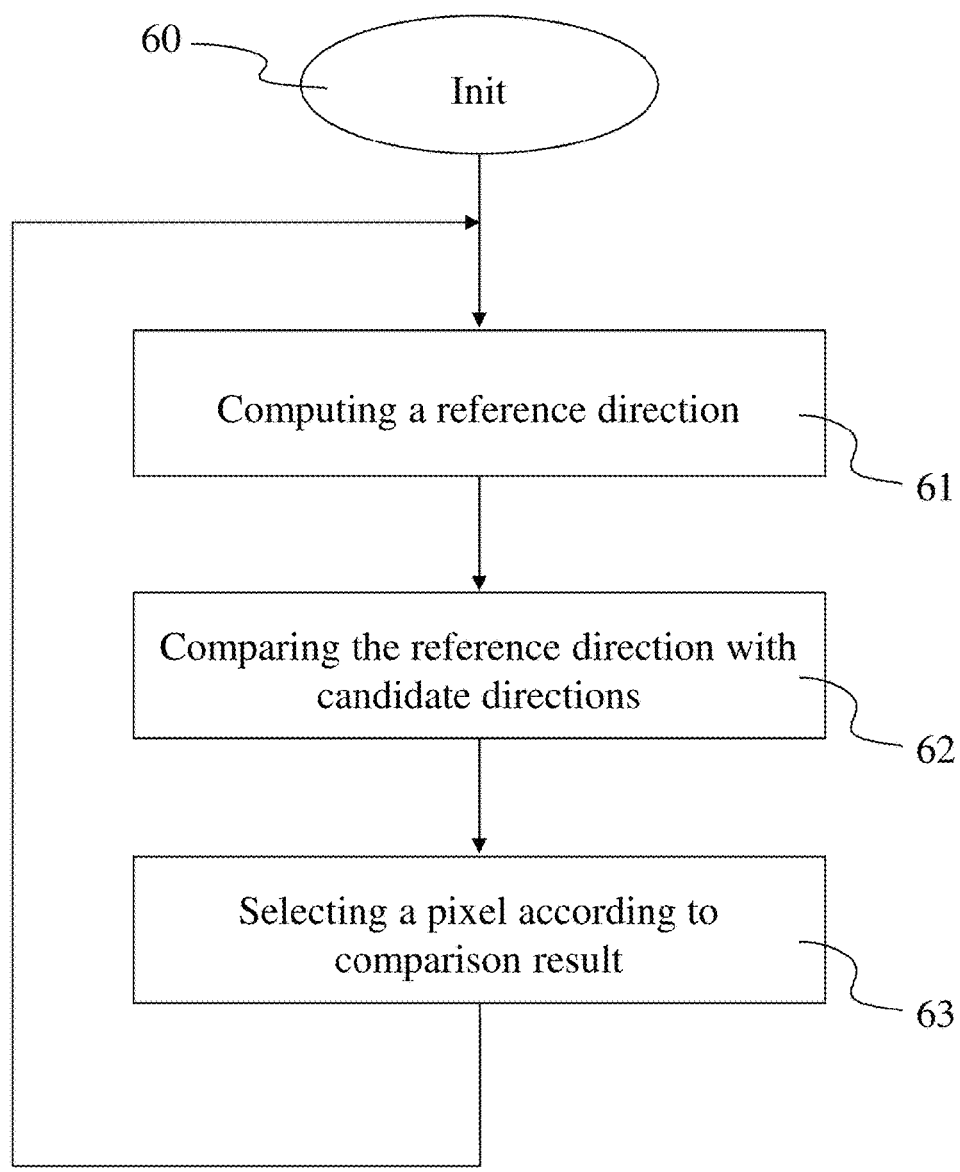

FIG. 5 diagrammatically shows a device implementing a method of processing the geometry image of FIG. 1, according to a particular embodiment;

FIG. 6 shows a method of processing the geometry image of FIG. 1, according to a particular embodiment.

5. DETAILED DESCRIPTION OF EMBODIMENTS

The present disclosure will be described in reference to a particular embodiment of a method of processing a geometry image that has been generated from a mesh representing a virtual 3D scene. The geometry image advantageously comprises a plurality of charts, for example a first chart and one or more second charts, each first and second chart representing a part of the 3D scene. By assembling the first and second charts with each other, it may be possible to reconstruct the mesh and thus the 3D scene. A reference direction is advantageously computed by using the mesh coordinates associated with a current pixel of the first chart that is different from the pixels forming the border of the first chart and the mesh coordinates associated with a first pixel belonging to the border of the first chart and located along a determined direction having as origin the current pixel. The reference direction is then advantageously compared with a plurality of candidate directions. Each candidate direction has as origin the current pixel and is defined as passing through a pixel of the border of the second chart corresponding to a pixel belonging to the neighbourhood of the first pixel, the mesh coordinates of the pixel of the border of the second chart (called indirection mesh coordinates) being associated with the pixel belonging to the neighbourhood of the first pixel that corresponds to the latter pixel of the border of the second chart. Based on the comparison result, one of the candidate directions is selected, which enables to select the pixel of the border of the second chart that may correspond to the current pixel. Such information is very useful when reconstructing the 3D scene from the charts as it enables to determine which second chart (and which pixel of the border of the second chart) is to be associated with the first chart when departing from a current pixel of the first chart along the determined direction.

FIG. 1 shows a geometry image 1 associated with a 3D virtual scene, according to a specific and non-limitative embodiment. The 3D virtual scene comprises virtual objects, the surfaces of which being advantageously represented with a mesh of polygons defined with their vertices coordinates (x, y, z) expressed in the world space, i.e. the space of the 3D virtual scene. The geometry image 1 is advantageously obtained with the parameterization of the mesh using any existing multi-chart unwrapping methods such as the ones described in "Mesh parameterization methods and their applications" by Sheffer et al. (Foundation and Trends in Computer Graphics and Vision, 2(2): 105-171, 2006). According to these methods, the mesh is first segmented into a plurality of charts, wherein each chart corresponds to a piece of the 3D virtual scene, i.e. to a piece of the 3D surface defined by the mesh. The mesh charts are then mapped on a 2D grid of pixels, which corresponds to the geometry image 1. The geometry image 1 thus comprises a plurality of charts, each pixel of the chart being assigned mesh coordinates obtained by interpolation of the coordinates of the vertices of the mesh during a rasterizing process. Pixels located between two charts are not assigned any mesh coordinates as they do not correspond to any element of the 3D virtual scene.

In the example of FIG. 1, the geometry image 1 comprises 5 charts A 10, B 11, C 12, D 13 and 14, each chart having arbitrary boundaries and shapes. Indirection information is advantageously associated with pixels located at the border of the charts 10 to 14. The indirection information corresponds to indirection pointers that may be used to jump from a chart to another chart according to a determined direction. The indirection information is for example stored with the pixels forming the border of the chart. Such pixels may be called inner border pixels. According to another example, the indirection information is stored with the pixels located outside from the chart but adjacent to the pixels forming the border of the chart. Such pixels may be called outer border pixels. When taking the example of the chart A 10, called first chart A 10, the border comprising the inner border pixels is identified with the reference 100 and the outer border comprising the outer border pixels is identified with the references 101, 102, 103 and 104. The outer border 101 associated with the first chart A 10 faces the chart B 11. The outer border 102 associated with the first chart A 10 faces the chart C 12. The outer border 103 associated with the first chart A 10 faces the chart C 13. The outer border 104 associated with the first chart A 10 faces the chart D 14. Charts B 11, C 12, D 13 and E 14 will be called second charts in the rest of the description. Examples of determined directions for jumping from the first chart A 10 to a second chart B 11, C 12, D 13 or E 14 are illustrated with arrows on FIG. 1.

Naturally, inner border pixels or outer border pixels of the second charts may also comprise indirection information for jumping from a considered second chart to another second chart or to the first chart.

The number of charts is not limited to 5 as in the example of FIG. 1 but extends to any number greater than or equal to 2 charts.

Figure 2:
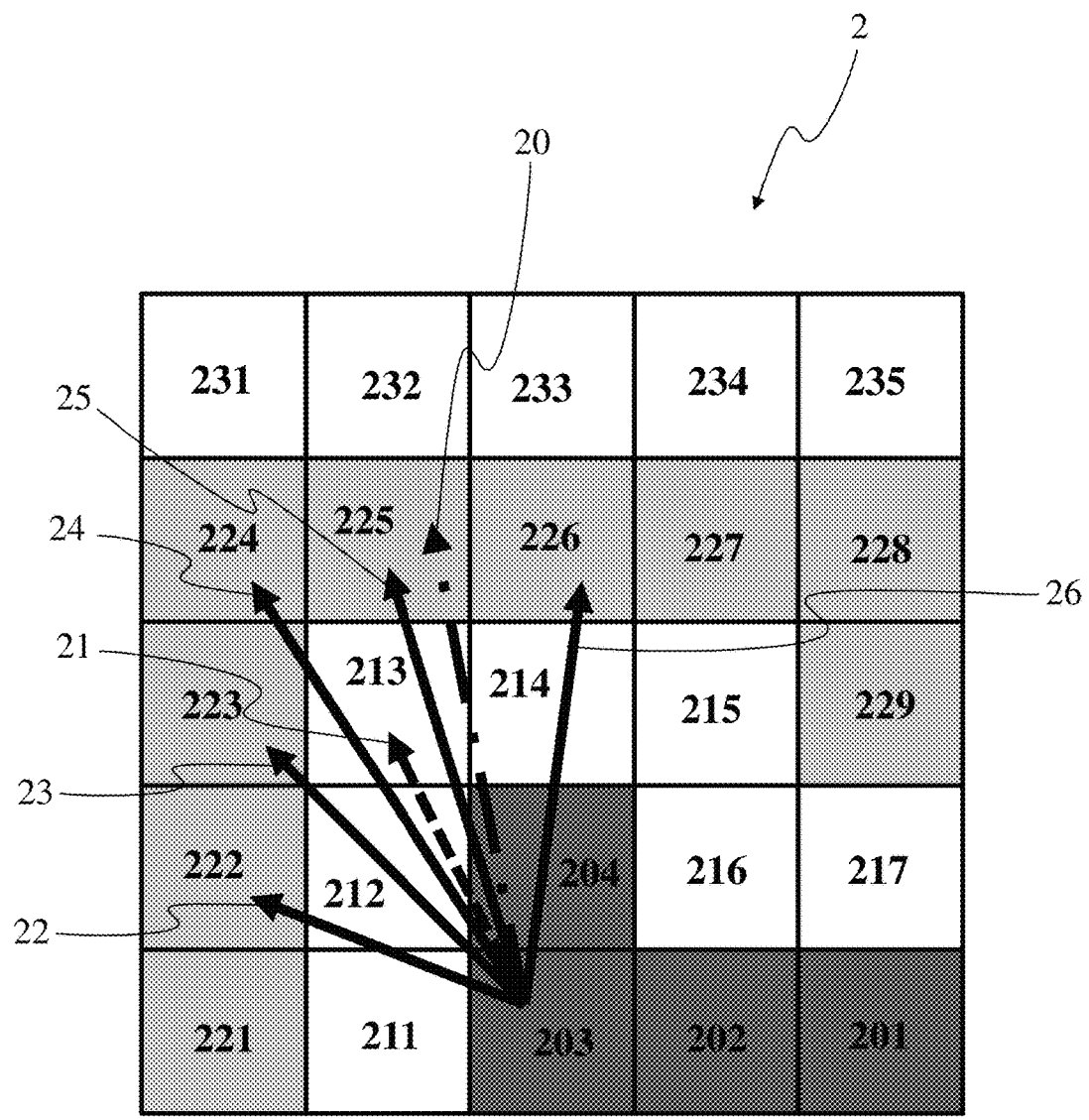
FIG. 2 shows a block of pixels located at the border of a first chart of the geometry image of FIG. 1, according to a particular embodiment.

FIG. 2 shows a block 2 of pixels located at the border of the first chart of the geometry image 1, according to a specific and non-limitative embodiment. Pixels 201, 202, 203 and 204 shown in dark grey are called inner pixels as they are located inside the first chart and as they are different from pixels of the first chart forming the border of the first chart. Pixels 211, 212, 213, 214, 215, 216 and 217 shown in white are called inner border pixels as they belong to and form the border of the first chart. Each one of these pixels 211, 212, 213, 214, 215, 216 and 217 is adjacent to at least one of the inner pixels 201 to 204. Each inner pixel 201 to 204 and each inner border pixel 211 to 217 is assigned mesh coordinates corresponding to either the coordinates of a vertex of the mesh or to coordinates obtained by interpolating the coordinated of vertices of the mesh. Pixels 221, 222, 223, 224, 225, 226, 227, 228 and 229 shown in light grey are called outer border pixels as they do not belong to the first chart but correspond to the first pixels outside of the first chart crossed when scanning the geometry image 1 from any one of the inner pixels 201 to 204 toward the outside of the first chart. Each one of these outer border pixels 221 to 229 is adjacent to at least one of the inner border pixels 211 to 217. The outer border pixels 221 to 229 establish the boundary between the pixels of the first chart and the pixels not belonging to a chart. Pixels 231, 232, 233, 234 and 235 shown in white correspond to pixels not belonging to any chart and not belonging to any outer border of a chart. They correspond to pixels located between different charts and may also be called background pixels. Outer border pixels 221 to 229 and pixels 231 to 235 are not assigned mesh coordinates in contrast to pixels belonging to a chart as they do not refer to a surface of the 3D virtual scene.

The arrow 20 corresponds to a determined direction, corresponding to an arbitrary direction. Such a determined direction may be used when reconstructing the 3D virtual scene from the geometry image 1. To reconstruct the 3D virtual scene, it is necessary to put the charts back together by matching the borders of the charts. To that aim, one may depart from a source chart, for example the first chart, and scan the geometry image according to one or more determined directions as to find out which chart and which pixel of the chart correspond to the border of the first chart according to this or these determined directions. From the determined direction 20 is determined a reference direction 21, the reference direction 21 being computed from the mesh coordinates associated with the current pixel 203 (that corresponds to the origin of the determined direction 20) and from the mesh coordinates of the pixel 213, which is the first pixel of the border of the first chart crossed by the determined direction 20.

The reference direction 21 is then advantageously compared with a set of candidate directions 22, 23, 24, 25 and 26. Each candidate direction is defined with the mesh coordinates associated with the current pixel 203 (which is the origin of the determined direction 20 and of the reference direction 21) and with indirection mesh coordinates associated with a pixel of the neighborhood of the first pixel 213. It is understood with neighborhood of the first pixel 213 pixels of the outer border adjacent to the first pixel 213, i.e. pixels 222, 223, 224, 225 and 226 on FIG. 2. The indirection mesh coordinates associated with each pixel 222 to 226 correspond to the mesh coordinates of the pixel of the border of the second chart that would face the first chart when reconstructing the 3D virtual scene. For example, the indirection mesh coordinates associated with the pixel 222 (respectively the pixel 223, 224, 225 and 226) correspond to the mesh coordinates of the pixel of the border of the second chart that corresponds to the pixel 212 (respectively the pixel 223, 224, 225 and 226) of the border of the first chart. The pixel of the border of the second chart that corresponds to the pixel 212 (respectively the pixel 223, 224, 225 and 226) of the border of the first chart is advantageously determined by comparing the mesh coordinates of pixels of the border of the second chart with the mesh coordinates of the pixel 212 (respectively the pixel 223, 224, 225 and 226), the pixel of the border of the second chart corresponding to the pixel (respectively the pixel 223, 224, 225 and 226) being the one for which the difference between the mesh coordinates is minimal. According to a variant, the indirection mesh coordinates associated with the pixel 222 is determined by comparing mesh coordinates corresponding to the mean value of the mesh coordinates of the pixels of the inner border adjacent to the pixel 222 (i.e. pixels 211, 212 and 213) with mesh coordinates of pixels of the border of the second chart, the pixel of the border of the second chart corresponding to the pixel 222 being the one for which the difference between the mesh coordinates is minimal. A candidate direction corresponds to a direction passing by the current pixel 203 and a pixel of the second chart that is the pixel of the second chart corresponding to the pixel of the neighborhood associated with the candidate direction. Each candidate direction 22 to 26 is then compared with the reference direction 21 and the one for which the difference is minimal is selected. The selected candidate direction corresponds to the candidate direction the most parallel to the reference direction 21 among the set of candidate directions. Selecting a candidate direction enables to select the pixel of the border of the second chart associated with the candidate direction. According to the example of FIG. 2, one can notice that the candidate direction the most parallel to the reference direction 21 is the candidate direction 24, which means that the pixel of the border of the second chart selected as corresponding to the first pixel 213 is the pixel of the border of the second chart, the mesh coordinates of which are associated with the pixel 224, while the determined direction passes 20 through the pixel 225 associated with another pixel of the border of the second chart. Such a difference may be for example due to the use of the mean mesh coordinates of pixels of the inner border for determining the pixel of the border of the second chart to be associated with pixels of the outer border of the first chart.

According to a variant, the candidate direction is selected by using the following matching value computed for each k pixel 222, 223, 224, 225, and 226 of the neighborhood of the first pixel 213:

$$\frac{innerPos - curPos}{|innerPos - curPos|} \cdot \frac{outerPos^k - curPos}{|outerPos^k - curPos|}$$

Where curPos corresponds to the mesh coordinates of the current pixel, for example the pixel 203,
innerPos corresponds to the mesh coordinates of the first pixel 213,
outerPos corresponds to the indirection mesh coordinates associated with the k pixels 222, 223, 224, 225, 226 of the neighborhood of the first pixel 213.
According to this variant, the indirection pixel (i.e. one of the pixel of the border of the second chart associated with one of the pixels 222 to 226) having the closest matching value to 1 is then selected as being the best matching pixel for indirection along the determined direction 20.

According to another variant, pixels of the neighborhood of the first pixel 213 used to compute the candidate directions belong to the border of the first chart. According to this variant, the pixels of the neighborhood are for example the pixels of the inner border of the first chart equal to or adjacent to the first pixel 213, i.e. pixels 212, 213 and 214 in the exemplar embodiment of FIG. 2. In addition to the mesh coordinates of the pixels 212, 213 and 214 are associated indirection mesh coordinates with each pixel 212, 213 and 214. The indirection mesh coordinates associated with each of these pixels, for example with the pixel 212, correspond to the mesh coordinates of a pixel of the border of the second chart corresponding to this pixel 212, i.e. the pixel of the border of the second chart having the mesh coordinates the closest with the mesh coordinates of the pixel 212.

The process described hereinabove with regard to FIG. 2 is advantageously reiterated for several current pixels of the first chart and/or for several determined directions.

Figure 3:
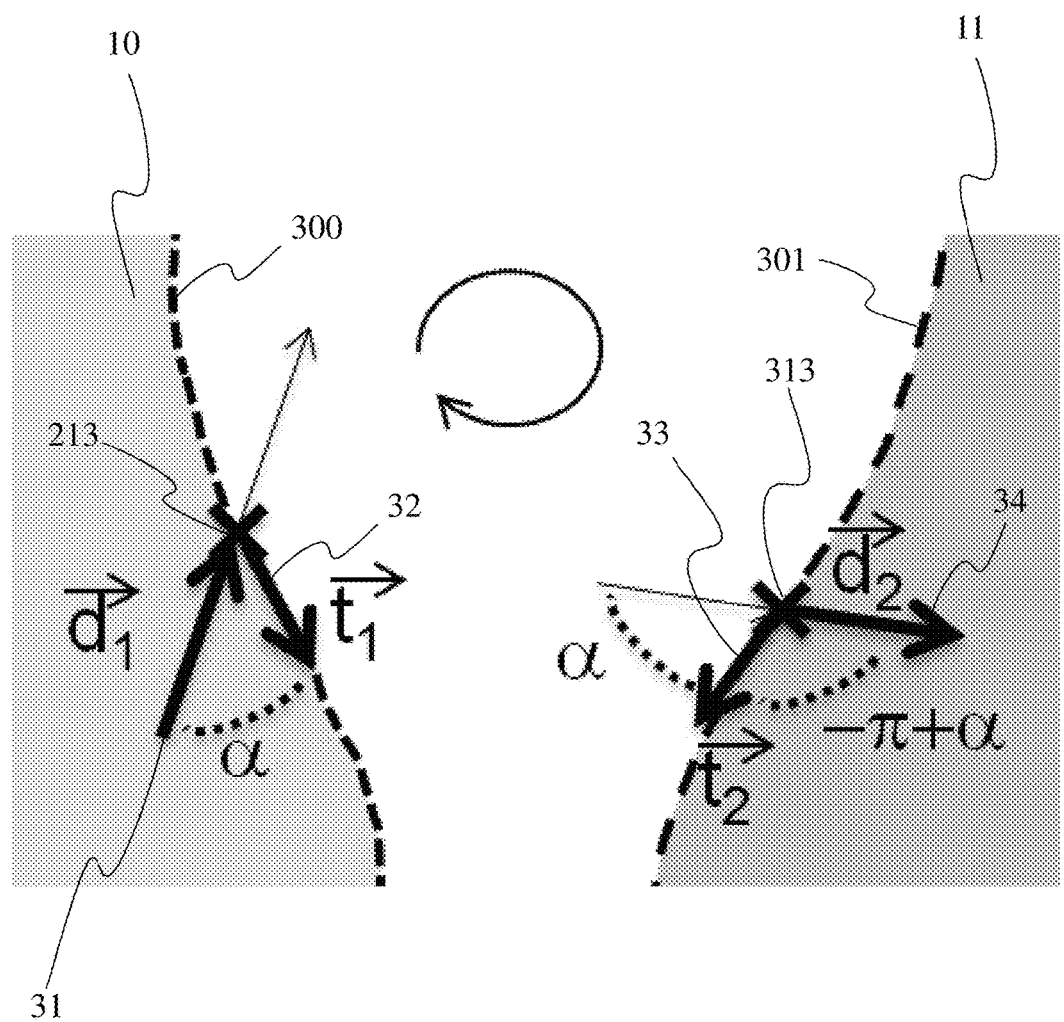
FIG. 3 shows borders of a first chart and of a second chart of the geometry image of FIG. 1, according to a particular embodiment.

FIG. 3 shows parts of the borders of the first chart 10 and of the second chart 11 of the geometry image 1, according to a specific and non-limitative embodiment. d1 31 corresponds advantageously to the candidate direction selected as being the best match to the determined direction 20. t1 32 represents the tangent vector to the border 300 at the first pixel 213, which corresponds to the first pixel of the border of the first chart 10 used for illustrating the exemplar embodiment of FIG. 2. An angle α is formed by the two vectors d1 31 and t1 32. d2 34 corresponds advantageously to the marching direction corresponding to direction d1 31 when scanning the geometry image, for example for reconstruction purpose of the 3D virtual scene. T2 33 represents the tangent vector to the border 301 of the second chart 11 at a second pixel 313, which corresponds to the first pixel 213. The destination marching direction d2 34 is the rotation of t2 33 of −π+α.

Adjacent charts, i.e. the first and second charts, may have various orientations, according to the method used for organizing the charts within the geometry image. From this observation, the same marching direction from the first chart A 10 to a second chart, for example the second chart B 11, may be used only if their adjacent edges are parallel. However, as soon as different rotations are applied to adjacent charts, a new orientation for the marching direction has to be computed, when jumping from the first chart A to the second chart B. Thus, being on the first chart A 10 with a given first 2D marching direction d1 31, the consistent second 2D marching direction at the second chart B 11 is a rotation of the initial direction.

In order to compute the rotation to apply to the 2D marching direction d2 34, local tangents t1 32 and t2 33 at the border of the first and second charts are computed. This is invariant to rotation, translation and scale operations computed during chart placement step of the parameterization process, but not to mirroring operations. As the rotation process is based on the tangent of each first and second charts, both charts must be consistent in orientation. That is, they both have to be oriented either clockwise or counter-clockwise. If adjacent charts are not consistently oriented, the marching process will fail and inverse the rotation.

Figure 4A:
FIGS. 4A and 4B show respectively a block of pixel located at the border of the first chart and a block of pixel located at the border of the second chart of FIG. 3, according to a particular embodiment.

First, the tangent t1 32 for the first chart 10 is estimated, as illustrated with regard to FIG. 4A. Being on an outer border pixel 424 of the first chart 10, with mesh coordinates nextTexCoord, the 1-ring neighborhood (pixels 422, 423, 431, 425, 426, 414, 413 and 412) is scanned in clockwise order. During this scan, the first outer border pixel 425 after a background pixel 431, with texture coordinates nextTexCoordTangent, is considered as being part of the tangent t1. This tangent t1 is thus defined as: nextTexCoordTangent−nextTexCoord. FIG. 4A uses the same convention with regard to the grey level for identifying the pixels as in FIG. 2.

Figure 4B:
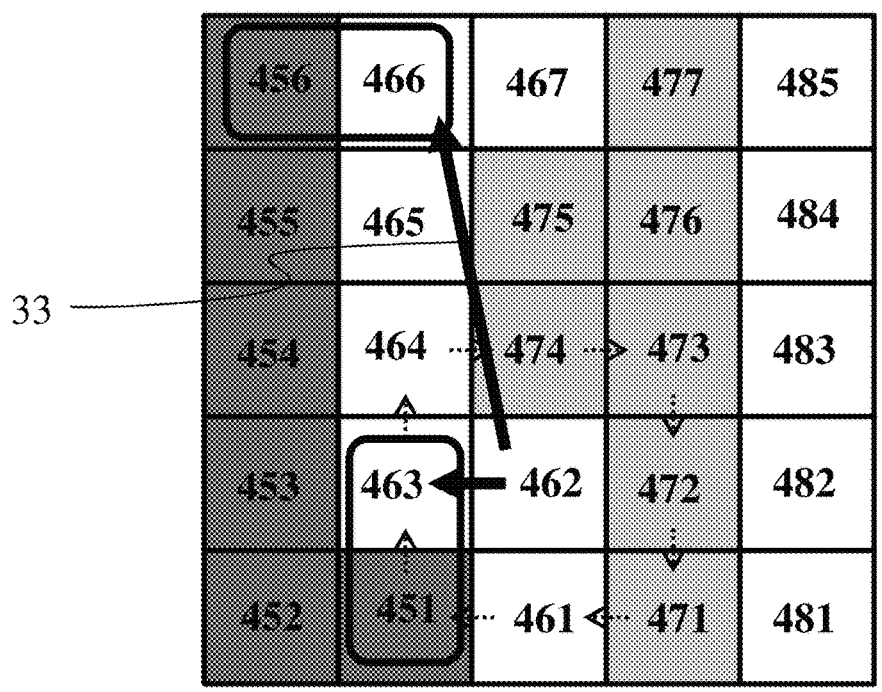

The angle α between the tangent t1 and the 2D marching direction d1 31 is computed. Then the outer border pixel 424 at nextTexCoord redirects to the inner border pixel 462 of the second chart 11, at newTexCoord, as illustrated with regard to FIG. 4B. The 1-ring neighborhood of this inner border pixel 462 is scanned. Here, the first inner border pixel 463 after an inner pixel 451, with texture coordinates newTexCoordTangent, is considered as being part of the tangent t2 33 at the second chart 11. The destination tangent t2 is thus defined as: newTexCoordTangent−newTexCoord. FIG. 4B uses the same convention with regard to the grey level for identifying the pixels as in FIG. 2.

The destination 2D marching direction d2 34 is a rotation of the destination tangent t1 32 of −π+α. However, fetching only the 1-ring neighborhood to compute the tangents may give inconsistent results. For instance, if two adjacent chart borders are rasterized slightly differently, the rotation may be over-estimated. Better tangent estimation is provided by computing the tangent at various pixel distances. The final tangent computation is modulated for example with distances of one pixel, three pixels and five pixels border tangents. Mean of the intermediate tangents allows smoother tangent estimation.

FIG. 5 diagrammatically shows a hardware embodiment of a device 5 configured for processing a geometry image such as the geometry image 1. The device 5 is also configured for the creation of display signals of one or several synthesis images representative of the 3D virtual scene reconstructed from the geometry image. The device 5 corresponds for example to a personal computer (PC), a laptop, a tablet, a Smartphone or a games console.

The device 5 comprises the following elements, connected to each other by a bus 55 of addresses and data that also transports a clock signal:
 a microprocessor 51 (or CPU),
 a graphics card 52 comprising:
  several Graphical Processor Units (or GPUs) 520,
  a Graphical Random Access Memory (GRAM) 521,
 a non-volatile memory of ROM (Read Only Memory) type 56,
 a Random Access Memory or RAM 57,
 one or several I/O (Input/Output) devices 54 such as for example a keyboard, a mouse, a webcam, and
 a power source 58.

The device 5 also comprises a display device 53 of display screen type directly connected to the graphics card 52 to display synthesized images calculated and composed in the graphics card, for example live. The use of a dedicated bus to connect the display device 53 to the graphics card 52 offers the advantage of having much greater data transmission bitrates and thus reducing the latency time for the displaying of images composed by the graphics card. According to a variant, a display device is external to the device 5 and is connected to the device 5 by a cable or wirelessly for transmitting the display signals. The device 5, for example the graphics card 52, comprises an interface for transmission or connection (not shown in FIG. 5) adapted to transmit a display signal to an external display means such as for example an LCD or plasma screen or a video-projector.

It is noted that the word "register" used in the description of memories 521, 56, and 57 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 51 loads and executes the instructions of the program contained in the RAM 57.

The random access memory 57 notably comprises:
 in a register 570, the operating program of the microprocessor 51 responsible for switching on the device 5,
 parameters 571 representative of the geometry image (for example mesh coordinates associated with pixels of the charts).

The algorithms implementing the steps of the method specific to the present disclosure and described hereafter are stored in the memory GRAM 521 of the graphics card 52 associated with the device 5 implementing these steps. When switched on and once the parameters 571 representative of the environment are loaded into the RAM 57, the graphic processors 520 of the graphics card 52 load these parameters into the GRAM 521 and execute the instructions of these algorithms in the form of microprograms of "shader" type using HLSL (High Level Shader Language) language or GLSL (OpenGL Shading Language) for example.

The random access memory GRAM 521 notably comprises:
 in a register 5211, the parameters representative of the geometry image,
 in a register 5212, the indirection mesh coordinates associated with either pixels of the border of the charts or with pixels outside and adjacent to the border of the charts.

According to a variant, the first and second identifiers and the distances are stored in the RAM 57 and processed by the microprocessor 51.

According to another variant, a part of the RAM 57 is assigned by the CPU 51 for storage of the identifiers and the distances if the memory storage space available in GRAM 521 is insufficient. This variant however causes greater latency time in the composition of an image comprising a representation of the environment composed from microprograms contained in the GPUs as the data must be transmitted from the graphics card to the random access memory 57 passing by the bus 55 for which the transmission capacities are generally inferior to those available in the graphics card for transmission of data from the GPUs to the GRAM and vice-versa.

According to another variant, the power supply 58 is external to the device 5.

FIG. 6 shows a method of processing a geometry image implemented for example in a device 5, according to a non-restrictive advantageous embodiment.

During an initialisation step 60, the different parameters of the device 5 are updated. In particular, the parameters representative of the geometry image 1 are initialised in any way.

Then during a step 61, a reference direction is computed by using values associated with two pixels of a first chart of a geometry image, the geometry image comprising a first chart and at least one second chart. The geometry image is the result of the parameterization process of a synthesis image representative of a 3D virtual scene represented with a mesh of polygons. The values used for computing the reference direction correspond advantageously to mesh coordinates associated with the pixels of the first chart, the mesh coordinates resulting from the parameterization process when rasterizing the geometry image. The two pixels of the first chart used for computing the reference direction correspond to a current pixel and a first pixel. The current pixel corresponds to one of the pixels of the chart but the pixels forming the border of the first chart. The first pixel corresponds to the first pixel of the border of the first chart crossed by a determined direction having as origin the current pixel. The determined direction is an arbitrary direction, also called first 2D marching direction as the determined direction correspond to a direction used for scanning the charts, for example when reconstructing the 3D virtual scene using the geometry image. Indeed, for reconstructing the 3D virtual scene from the charts, it is necessary to join charts with each other by respecting the borders, i.e. by matching pixels of the border of the first chart with pixels of the border of the second chart.

Then during a step 62, the reference direction is compared with a set of candidate directions. Each candidate direction is computing by using the mesh coordinates associated with the current pixel and with indirection mesh coordinates associated with one pixel belonging to the neighbourhood of the first pixel used for computing the reference direction.

The indirection mesh coordinates advantageously correspond to the mesh coordinates of a pixel (called second pixel) of the border of a second chart, the second pixel being the pixel of the second chart that corresponds to the pixel of the neighbourhood of the first pixel used for computing the reference direction. A pixel of the border of the second chart (the second chart being the complementary chart of the first chart according to the determined direction) is said corresponding pixel of the pixel of the neighbourhood of the first pixel when the mesh coordinates of this second pixel are the closest to the mesh coordinates associated with the pixel of the neighbourhood (used for computing the candidate direction) among a plurality of pixels of the border of the second chart complementary to the first chart. The second pixel is for example determined by comparing the mesh coordinates of a plurality of pixels of the border of the second chart with the mesh coordinates associated with the pixel of the neighbourhood of the first pixel and by selecting the pixel of the border of the second chart for which the difference between the mesh coordinates is minimal in comparison with the other pixels of the border of the second chart.

Pixels belonging to the neighbourhood of the first pixel and used for computing the candidate directions advantageously belong to 1-ring pixels surrounding the first pixel and adjacent to the first pixel but not belonging to the first chart. In other words, the pixels of the neighbourhood of the first pixels are some of the pixels located outside the first chart but adjacent to the border of the first chart (and adjacent to the first pixel). These pixels of the neighbourhood correspond to the outer border of the first chart and form the first line of pixels outside the first chart and surrounding the first chart. It is advantageous to use these outer border pixels for computing the candidate directions as there is no mesh coordinates associated with them (as they do not refer to any object's surface of the 3D virtual scene as outside of the charts) as a result of the parameterization process. It is thus possible to use the free buffer space associated with these pixels to store the indirection mesh coordinates used for computing the candidate directions. The indirection mesh coordinates associated with each of these outer border pixels is determined as explained hereinabove by comparing the mesh coordinates of pixels of the border of the second chart with mesh coordinates associated with this outer border pixel. As there is no mesh coordinates associated with this outer border pixel as a result of the parameterization process, the mesh coordinates used for the comparison correspond to the mesh coordinates associated with the pixel of the border of the first chart which is fully adjacent to this outer border pixel. According to a variant, the mesh coordinates to be used for the comparison correspond to a mean of the mesh coordinates of several pixels (for example 2, 3, 4 or 5) of the border of the first chart, for example pixels of the border of the first chart being in contact with the pixel of the outer border pixel.

According to a variant, Pixels belonging to the neighbourhood of the first pixel and used for computing the candidate directions correspond to pixels of the border of the first chart being in contact with the first pixel, including the first pixel. An advantage of this variant is that there is no need to search for mesh coordinates associated with these pixels for determining the indirection mesh coordinates as mesh coordinates resulting from the parameterization process have been already computed and associated with these pixels as they belong to the first chart.

Then during a step 63, a pixel of the border of the second chart is selected as being the corresponding pixel of the first pixel, the selection of this pixel of the second chart being based on the result of the comparison between the reference direction and each candidate direction. The selection of a pixel of the border of the second chart for being the corresponding pixel of the first pixel (which belongs to the border of the first chart) enable to put back together the first chart and the second chart (for example when reconstructing the 3D virtual scene from the geometry image) by matching the pixels of the border of the first chart with pixels of the border of the second chart by best respecting the coherence of the mesh (represented with the mesh coordinates associated with the pixels of the first and second charts). The selected pixel of the border of the second chart is the one for which the associated candidate direction (among the plurality of candidate direction used in the comparison step) is the most parallel to the reference direction. In other words, the selected pixel corresponds to the pixel for which the difference between the reference direction and the candidate direction associated to this selected pixel is minimal with regard to the differences between the reference direction and the other candidate directions.

Naturally, steps 61 to 63 may be reiterated for several different determined directions and/or for several different current pixels of the first chart or of other chart different from the first chart.

According to an optional variant, the method further comprises a step of determining a direction for scanning the second chart, called second 2D marching direction. This second 2D marching direction enables to scan the second chart according to a direction that corresponds to the determined direction. This second 2D marching direction is advantageously determined by using the determined direction (which is also called the first 2D marching direction), the tangent to the border of the first chart at the first pixel and the tangent to the border of the second chart at the selected pixel.

Naturally, the present disclosure is not limited to the embodiments previously described.

In particular, the present disclosure is not limited to a method of processing a geometry image but also extends to any device implementing this method and notably any devices comprising at least one GPU. The implementation of calculations necessary to the processing of the geometry image is not limited either to an implementation in shader type microprograms but also extends to an implementation in any program type, for example programs that can be executed by a CPU type microprocessor. The use of the methods of the present disclosure is not limited to a live utilisation but also extends to any other utilisation, for example for processing known as postproduction processing in a recording studio for the display of synthesis images for example.

The present disclosure also relates to a method (and a device configured) for reconstructing a 3D virtual scene (or part of it) from a geometry image.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of processing a geometry image, wherein the geometry image being generated from a mesh associated with a 3D scene, the geometry image comprising a first chart and at least a second chart, each first and second chart representing a part of the 3D scene, the method comprising, for at least one current pixel of the first chart different from pixels of the first chart forming border of the first chart:
   computing a reference direction from mesh coordinates associated with the at least one current pixel and mesh coordinates associated with a first pixel, the first pixel corresponding to a pixel of the border of the first chart located along a determined direction having as origin said at least one current pixel,
   comparing the reference direction with a set of candidate directions, each candidate direction being computed from the mesh coordinates associated with the at least one current pixel and indirection mesh coordinates associated with one pixel of the neighbourhood of the first pixel, the indirection mesh coordinates corresponding to mesh coordinates of a pixel of the border of said at least a second chart corresponding to said pixel of the neighbourhood of the first pixel,
   selecting a pixel of the border of the at least a second chart according to the comparison result;
   rendering at run-time an image of a part of said 3D scene based on said at least one current pixel of the first chart and said selected pixel of the border of the at least a second chart; and
   displaying said image.

2. The method according to claim 1, wherein pixels of the neighbourhood of the first pixel used to compute candidate directions belong to the border of the first chart.

3. The method according to claim 1, wherein pixels of the neighbourhood of the first pixel used to compute candidate directions are outside the boundary of the first chart and adjacent to the first pixel.

4. The method according to claim 1, wherein the pixel of the border of said at least a second chart which corresponds to said pixel of the neighbourhood of the first pixel is determined by comparing the mesh coordinates of said pixel of the neighbourhood of the first pixel with mesh coordinates of a plurality of pixels of the border of the at least a second chart, the determined pixel of the border of the at least a second chart being the pixel for which the difference between its mesh coordinates and the mesh coordinates of said pixel of the neighbourhood of the first pixel is minimal.

5. The method according to claim 1, wherein the selected pixel corresponds to the pixel for which the difference between the reference direction and the candidate direction associated with said selected pixel is minimal with regard to the differences between the reference direction and the other candidate directions.

6. The method according to claim 1, wherein the method further comprises determining a direction for scanning the at least a second chart corresponding to said determined direction, said direction being determined according to the determined direction, a tangent to the border of the first chart at said first pixel and a tangent to the border of the at least a second chart at the selected pixel.

7. A non-transitory processor readable medium having stored therein instructions for causing a processor to perform at least the steps of the method according to, claim 1.

8. A device configured for processing a geometry image, wherein the geometry image being generated from a mesh associated with a 3D scene, the geometry image comprising a first chart and at least a second chart, each first and second chart representing a part of the 3D scene, the device comprising a memory associated with at least one processor configured to, for at least one current pixel of the first chart different from pixels of the first chart forming border of the first chart:
- compute a reference direction from mesh coordinates associated with the at least one current pixel and mesh coordinates associated with a first pixel, the first pixel corresponding to a pixel of the border of the first chart located along a determined direction having as origin said at least one current pixel,
- compare the reference direction with a set of candidate directions, each candidate direction being computed from the mesh coordinates associated with the at least one current pixel and indirection mesh coordinates associated with one pixel of the neighbourhood of the first pixel, the indirection mesh coordinates corresponding to mesh coordinates of a pixel of the border of said at least a second chart corresponding to said pixel of the neighbourhood of the first pixel,
- select a pixel of the border of the at least a second chart according to the comparison result;
- render at run-time an image of a part of said 3D scene based on said at least one current pixel of the first chart and said selected pixel of the border of the at least a second chart;

the device further comprising a display screen configured to display said image.

9. The device according to claim 8, wherein pixels of the neighbourhood of the first pixel used to compute candidate directions belong to the border of the first chart.

10. The device according to claim 8, wherein pixels of the neighbourhood of the first pixel used to compute candidate directions are outside the boundary of the first chart and adjacent to the selected pixel.

11. The device according to claim 8, wherein the at least one processor is further configured to compare the mesh coordinates of said pixel of the neighbourhood of the first pixel with mesh coordinates of a plurality of pixels of the border of the at least a second chart to determine the pixel of the border of said at least a second chart which corresponds to said pixel of the neighbourhood of the first pixel, the determined pixel of the border of the at least a second chart being the pixel for which the difference between its mesh coordinates and the mesh coordinates of said pixel of the neighbourhood of the first pixel is minimal.

12. The device according to claim 8, wherein the selected pixel corresponds to the pixel for which the difference between the reference direction and the candidate direction associated with said selected pixel is minimal with regard to the differences between the reference direction and the other candidate directions.

13. The device according to claim 8, wherein the at least one processor is further configured to determine a direction for scanning the at least a second chart corresponding to said determined direction, said direction being determined according to the determined direction, a tangent to the border of the first chart at said first pixel and a tangent to the border of the at least a second chart at the selected pixel.

14. The device according to claim 8, wherein the at least one processor is a Graphical Processor Unit (GPU).

* * * * *